United States Patent [19]

Okabe

[11] Patent Number: 5,293,543
[45] Date of Patent: Mar. 8, 1994

[54] APPARATUS FOR COLOR IMAGER DEFECT DETERMINATION

[75] Inventor: Kinji Okabe, Yokohama, Japan

[73] Assignee: Kabushiki Kaisha Toshiba, Kawasaki, Japan

[21] Appl. No.: 833,436

[22] Filed: Feb. 11, 1992

[30] Foreign Application Priority Data

Feb. 13, 1991 [JP] Japan .................................. 3-20022

[51] Int. Cl.⁵ .............................................. H04N 9/07
[52] U.S. Cl. .................................... 358/504; 358/523; 348/187
[58] Field of Search .................. 358/213.17, 163, 41, 358/43, 44, 504, 523; H04N 9/07

[56] References Cited

U.S. PATENT DOCUMENTS

| | | | |
|---|---|---|---|
| 4,237,488 | 12/1980 | Takemura | 358/213.17 X |
| 4,542,404 | 9/1985 | Duschl | 358/213.17 X |
| 4,628,352 | 12/1986 | Boue | 358/213.17 X |
| 4,701,784 | 10/1987 | Matsuoka et al. | 358/163 X |
| 4,739,495 | 4/1988 | Levine | 358/163 X |
| 4,858,013 | 8/1989 | Matsuda | 358/213.17 |
| 5,101,271 | 3/1992 | Andrews et al. | 358/213.17 |
| 5,113,246 | 5/1992 | Ninomiya et al. | 358/163 X |

Primary Examiner—Mark R. Powell
Attorney, Agent, or Firm—Foley & Lardner

[57] ABSTRACT

An inspection apparatus for color solid-state image pickup elements is configured to be provided with an A/D converter that performs the A/D conversion of the image signals which are the output of a color solid-state image pickup element, an image memory that stores the image signals that have been A/D converted by the A/D converter, a storage element that stores as a table the numerical hue data that express the degree to which color unevenness can be recognized by the human eye, a calculation circuit that performs image calculation processing on the basis of the image data stored in an image memory and that calculates judgment parameters on the basis of these calculation results and the hue data that is stored in the storage element, and a judgment circuit that judges whether a color solid-state image pickup element is faulty or not, on the basis of the judgment parameters.

7 Claims, 3 Drawing Sheets

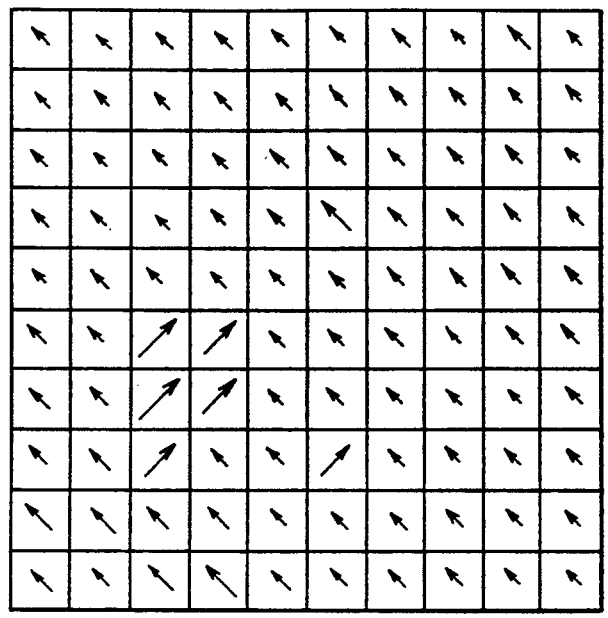
F I G. 4
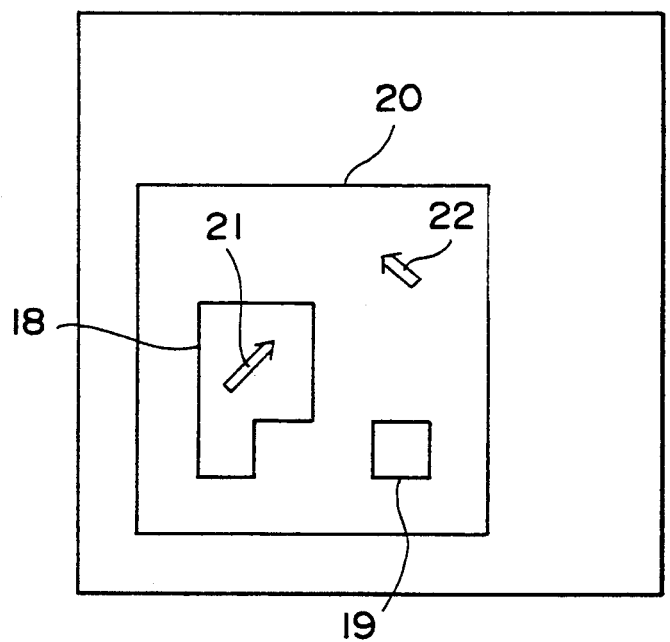
F I G. 5

APPARATUS FOR COLOR IMAGER DEFECT DETERMINATION

BACKGROUND OF THE INVENTION

The present invention relates to a fault inspection apparatus of a color, solid state image pickup element and, more particularly, to an inspection apparatus for the detection of color unevenness.

In general, color unevenness is one of the faults that can occur in color solid-state image pickup elements. These color unevenness faults the color of a fault portion either locally or over the entirety of the display, and are faults where there are slight color discrepancies (color differences or differences in the color density) between the colors of the entire image.

Conventionally, the determination of faulty or non-faulty color unevenness depended upon human perception, and a visual test was performed by a test operator. This is described with reference to FIG. 1. In FIG. 1, a color solid-state image pickup element 72 that performs scanning is first mounted to a camera 73. Then, the image of a light source 71 is led to a monitor 74 via a color solid-state image pickup element 72 and the camera 73, and a test operator 75 visually compares the image of the monitor 74 with a reference sample and judges whether or not there is a fault.

Since an inspection for faults in color unevenness of color solid image elements by such visual determination is dependent upon the perception of the operator, there are discrepancies in the fault judgments because of individual variations. There are also discrepancies in judgment when the same test operator makes such judgments over an extended period of time.

Also, judging faults is performed by comparison of a reference sample image that the test operator has memorized and so it is necessary to have many weeks of training for the memory of this reference sample image. Because of this, there is the problem that much skill is required to inspect for color unevenness faults, and that the training of test operators is an important problem for manufacturing management.

SUMMARY OF THE INVENTION

In the light of these problems, the present invention has as an object the provision of a fault inspecting apparatus of a color solid-state image pickup element, that can minimize scattering in the quality of color solid image elements to as little as possible, and that can automatically perform scanning.

The color solid-state image pickup element fault inspecting apparatus of the present invention is provided with A/D conversion means for performing the A/D conversion of the image signals which are the output of a color solid image element; an image memory for storing image signals that have been A/D converted by the A/D conversion means; storage means for storing in a table the numerical data that expresses the degree to which color unevenness can be recognized by the human eye; calculation means for performing image calculation processing on the basis of data that are stored in an image memory and for calculating judgment parameters on the basis of these calculation results and the data that is stored in the storage means; and judgment means for judging whether a color solid-state image pickup element is faulty or not on the basis of the judgment parameters.

According to an inspection apparatus of the present invention and having the configuration as described above, the image signals that have been A/D converted are stored in the image memory. Then, the data that are stored in this image memory are used as the basis for the performance of image calculation processing by the calculation means, and furthermore, the judgment parameters are calculated on the basis of these calculation results and the numerical data that expresses to which the human eye can recognize color unevenness and which is stored in the storage means. These judgment parameters are then used as the basis for judgment by the judgment means of whether or not a color solid-state image pickup element is faulty.

By this, it is possible to minimize discrepancies in the quality of color solid-state image pickup elements and to also have automated scanning.

According to the present invention, it is therefore possible to minimize discrepancies in the quality of color solid image elements and also to automate scanning.

BRIEF DESCRIPTION OF THE DRAWINGS

In the appended drawings:

FIG. 4 is a view describing the expression of an output image of a color solid-state image pickup element by a color vector, with respect to the fault inspection apparatus shown in FIG. 2;

FIG. 5 is a view describing the operation of the calculation means provided for the fault inspection apparatus shown in FIG. 2;

DETAILED DESCRIPTION OF THE PREFERRED EMBODIMENTS

The following is a detailed description of preferred embodiments of the fault inspection apparatus for the color solid state image pickup element of the present invention, with reference to the appended drawings.

Figure 2:
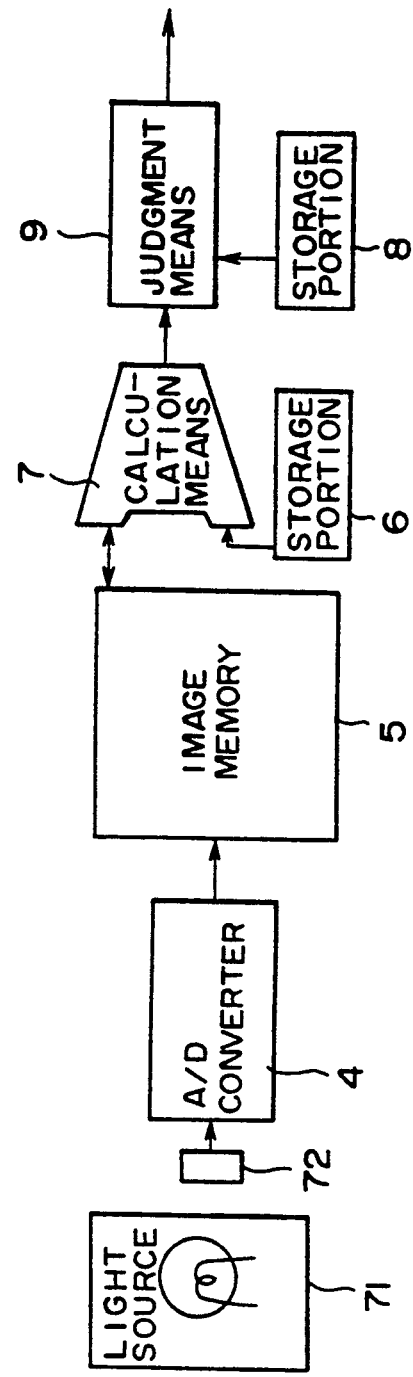
FIG. 2 is a block diagram showing an outline configuration of a fault inspection apparatus for color solid-state image pickup elements and, according, is to one embodiment of the present invention.
Figure 6:
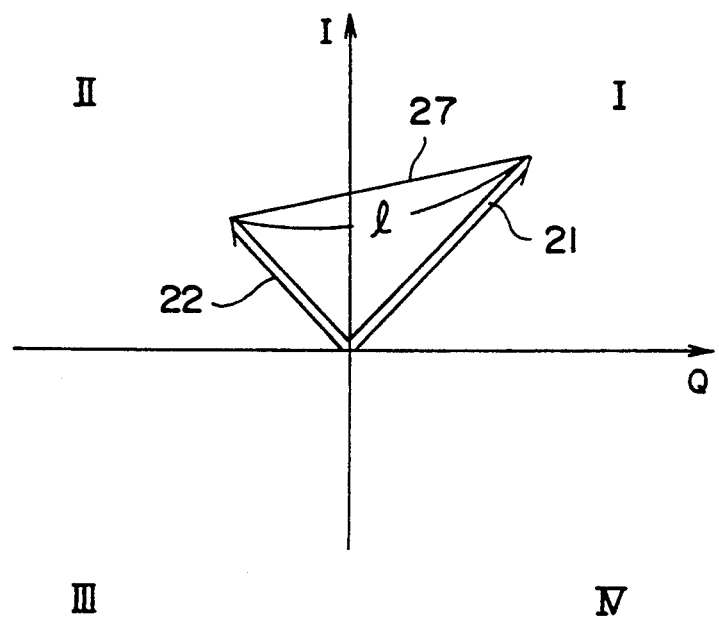
FIG. 6 is a view describing the operation of the calculation means provided for the fault inspection apparatus shown in FIG. 2.

FIG. 2 through FIG. 7 describe one embodiment of the color solid-state image pickup element fault inspection apparatus of the present invention. The configuration of the scanning apparatus of this embodiment is shown in FIG. 2. The inspection apparatus of this embodiment is provided with an A/D converter 4, an image memory 5, storage portions 6 and 8, calculation means 7 and judgment means 9. The A/D converter 4 performs the A/D conversion of image signals of the image from the light source 71 obtained, which is scanned via solid-state image pickup element 72. The image memory 5 stores the image signals of the light source 71 that have been converted from analog to a digital by the A/D converter 4. The storage portion 6 stores, in a table, the numerical data that express the degree to which color unevenness can be recognized by the human eye. The calculation means 7 performs image calculation processing on the basis of the image signals that are stored in the image memory 5, and determines the judgment parameters used in the judgment of faulty or non-faulty, on the basis of these calculation results and the data that are stored in the storage portion 6, and outputs these judgment parameters. The storage portion 8 stores standard values for the faulty or non-faulty judgments. The judgment means 9 performs faulty or non-faulty judgments on the basis of the standard values that are stored in the storage portion 8, and the judgment parameters that are the output of the calculation means 7.

Figure 3:
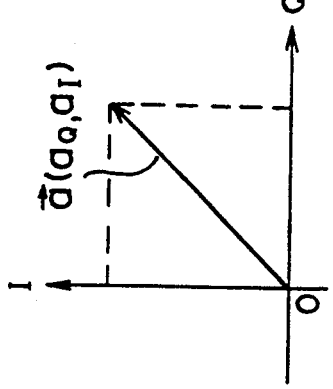
FIG. 3 is a view describing a color vector on a color vector plane, for describing the operation of the fault inspection apparatus of the present invention.
Figure 1:
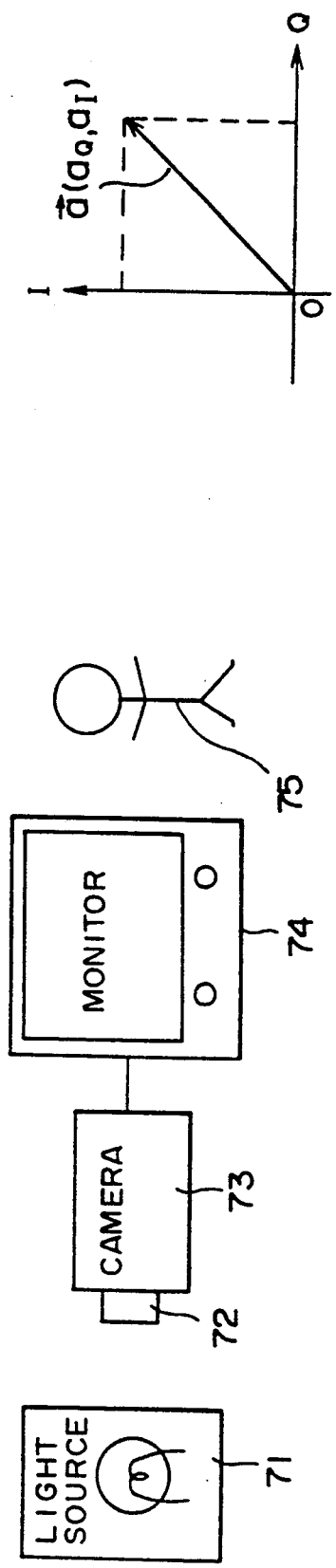
FIG. 1 is a block diagram showing an outline configuration of a conventional fault inspection apparatus for color solid-state image pickup elements.

Prior to the description of the operation of the present embodiment is a description of the expression of the color vectors, with reference to FIG. 3. A random color is expressed by a point on a color vector plane shown in FIG. 3 for example. This color vector plane is a coordinate system that has the Q (quadrature) axis as the horizontal axis and the vertical axis as the I (in phase) axis. The size and the direction of these color vectors expresses the color intensity and the color hue. Moreover, the Q component and the I component of the color vectors in FIG. 3 are determined using a predetermined equation from each of the components aR, aG and aB for the colors red (R), green (G) and blue (B). Also, in FIG. 3, the Q-I axes are used for the coordinate system but the R-Y axes or the B-Y axes can be used instead.

The I axis is equivalent to an I component of a chrominance (carrier wave) signal included in the image signal, and is an axis which connects an orange and cyanic-blue on a chromaticity diagram. The I component (an I signal) corresponds to a color change in the I axis direction and is given a frequency band of 1.3 MHz because the human beings have a comparatively high eyesight with respect to the I axis direction. A symbol "I" means "in phase" because a phase of subcarrier in the chrominance signal is close to a reference phase.

Furthermore, the Q axis is equivalent to a Q component of the chrominance signal, and is an axis which connects a blue and green on the chromaticity diagram. The Q component (a Q signal) corresponds to a color change in the Q axis direction and is limited in a frequency band of 0.5 MHz. A symbol "Q" means "quadrature" because a phase of the Q signal falls at a right angle to the phase of the I signal.

FIG. 4 shows an example of the expression of the output images of the color solid-state image pickup element 72 using these color vectors. The output image is divided into sub-blocks of M×N (both M and N are a positive and integral number of 2 or more, and the Q axis component and the I axis component are determined for each of these sub-blocks by the calculation means 7. For example, in FIG. 4, the number of sub-blocks are 10×10. FIG. 4 shows an image that has been expressed by color vectors for each sub-block. The methods of determining the Q axis component and the I axis component differ according to the color processing method and the color solid image element and are therefore, not described here but can be performed by theoretical calculations. It can also be determined by a known color signal processing circuit. A generally known apparatus for the calculation of the R-Y axis component and the B-Y component can also be used.

After the color vectors have been determined for each sub-block in this manner, integration processing is performed by the calculation means 7. More specifically, the color vector differences between adjacent sub-blocks, are determined for each of the color components, such as the I axis component and the Q axis component. Then, only the values of those differences that are greater than a predetermined value are extracted by the calculation means 7. Labelling processing to successively apply numbers (labels) to continuous regions on a binarized image—or a binarized image that has a threshold value provided to an image of many values—is then performed for the extracted sub-blocks, and only those portions that have a continuous plural number of sub-blocks are extracted. FIG. 5 shows an image that results from the implementation of this processing to the image shown in FIG. 4.

In FIG. 5, numeral 18 shows an extracted region, and numeral 19 shows a sub-block which was not ultimately extracted, and which is not continuous because the value for the difference between adjacent sub-blocks is large but is still less than a required value for the difference between other sub-blocks nearby. The mean color vector of the image inside the region 18 is determined and is expressed by the arrow with a color vector 21. Also, a region 20 with an arbitrary size that includes the regions 18 and 19 is set and the mean color vector for inside the region 20 and with the exception of regions 18 and 19 is determined, and this mean color vector is expressed by the arrow with a color vector 22. The color vector 21 expresses the mean of the color unevenness fault portions or the maximum color vector, and the color vector 22 expresses the mean color vector inside the background portion 20. A difference vector 27 between the color vector 21 and the color vector 22 is calculated by the calculation means 7 and this is expressed in FIG. 6. The value for the size (length) l of the difference vector 27 expresses the size of the color differences between the color unevenness portion and the background portion.

Figure 7:
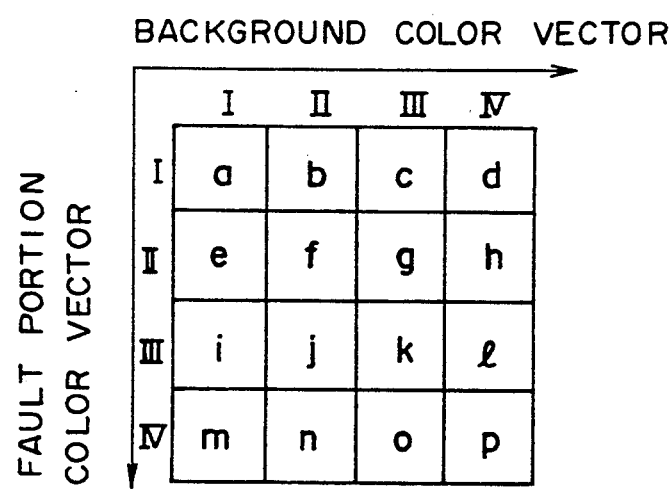
FIG. 7 is a view describing the table of numerical values for the degree for which color discrepancies are recognizable to the human eye.

The judgment of a color unevenness fault by eye is not only for the magnitude of the color differences, that is, the length l of the difference vector 27, but is a judgment reference for the magnitude of the color differences themselves. In the color vector plane, the direction of the color vector expresses the color hue, and so, in FIG. 6, the color hue is divided into four types for each quadrant, and are given the names I, II, III and IV. FIG. 7 is a view describing the table of numerical values for the degree for which color discrepancies are recognizable to the human eye, and this table is stored in the storage portion 6. In FIG. 7, the horizontal axis expresses the hue of the color vector and the vertical axis expresses the hue of the color vector of the fault portion. The letters a through p in the table express numerical values, and the numerical values are set in the order of the degree to which the human eye can recognize the color discrepancies. The hue of the color vector 21 of the fault portion 18 and the color vector 22 of the background portion 20 are II and I, respectively, and the equivalent value in the table of FIG. 7 is b.

In this manner, the judgment parameters determined by the calculation means 7, that is the size l and the difference (such as b, for example) in hue of the difference vector 27, are compared with the standard value stored in the storage portion 8 by means of the judgment means 9 so that a fault judgment can be made.

According to the embodiment as described above, it is possible to automatically perform inspection of color unevenness faults of a color solid-state image pickup element and for discrepancies in the quality to be minimized.

Moreover, in the embodiment described above, the color hue was divided into four types I to IV but the present invention is not limited to this. For example, if the color hue is divided into multiple-stages, it is possible to minimize discrepancies in the quality.

What is claimed is:

1. An inspection apparatus for inspecting a color solid-state image pickup element, comprising:

A/D conversion means for converting from analog to a digital form image signals outputted by the color solid-state image pickup element;

an image memory for storing as image data the image signals which have been A/D converted by said A/D conversion means;

storage means for storing as a table numerical hue data which represent the degree of color unevenness between an actual object and a stored image which is generally recognized by the human eye as a perceived color, said numerical hue data being a numeric representation of a hue difference between a fault portion of color unevenness and a normal color portion, as perceived by a normal human eye, this hue difference weighting the length of a difference vector used in determining the presence of a fault in the image pickup element;

calculation means for performing image processing on the basis of said image data stored in said image memory, and which calculates judgment parameters on the basis of these image calculation results and said numerical hue data stored in said storage means; and judgment means for judging whether a color solid-state image pickup element is faulty or not, on the basis of said judgment parameters.

2. The inspection apparatus according to claim 1, further comprising second storage means for storing a standard value in order to judge a fault of said color solid-state image pickup element; wherein said judgment means judges whether or not said solid-state image pickup element has a fault by comparing said judgment parameters supplied from said calculation means with said standard value stored in said second storage means.

3. The inspection apparatus according to claim 1; wherein said image signals outputted from said color solid-state image pickup element are expressed each sub-block of a plurality of sub-blocks (M×N) that a screen is divided into when the whole screen is one block, as points on a color vector plane which has a predetermined horizontal axis and a predetermined vertical axis and shows the strength of color by its length and the color hue by its direction, thereby calculating said judgment parameters and judging the faulty of said element on the basis of said color vectors.

4. The inspection apparatus according to claim 3; wherein said screen is divided into 10×10 sub-blocks.

5. The inspection apparatus according to claim 3; wherein said color vector plane is comprised of a quadrature (Q) axis as said vertical axis and an in-phase (I) axis as said horizontal axis.

6. The inspection apparatus according to claim 3; wherein said color vector plane is comprised of an R-Y axis as said vertical axis and a B-Y axis as said horizontal axis.

7. The inspection apparatus according to claim 1; wherein said calculation means provides a color vector for each sub-block of a plurality of sub-blocks into which the whole screen, as one block, is divided in the horizontal and vertical directions on the basis of image data stored in said image memory, calculates a vertical-axis component and a horizontal-axis component of each of adjacent sub-blocks after differential processing, further calculates color difference parameters obtained from said difference vector of a predetermined color, a numerical value from the table of numerical hue data and a hue difference corresponding to that recognized by the human eye, and extracts only the sub-blocks which have a difference over a predetermined value, thereby performing image calculating processing.

* * * * *